(12) United States Patent
Billmann et al.

(10) Patent No.: US 7,955,166 B2
(45) Date of Patent: Jun. 7, 2011

(54) METHOD AND APPARATUS FOR TREATING SAUSAGE CASING

(75) Inventors: Clint R. Billmann, New Holstein, WI (US); Kevin S. Meanor, Sheboygan, WI (US)

(73) Assignee: Johnsonville Sausage, LLC, Sheboygan Falls, WI (US)

( * ) Notice: Subject to any disclaimer, the term of this patent is extended or adjusted under 35 U.S.C. 154(b) by 191 days.

(21) Appl. No.: 12/236,263

(22) Filed: Sep. 23, 2008

(65) Prior Publication Data

US 2010/0075585 A1     Mar. 25, 2010

(51) Int. Cl.
    *A22C 11/00*     (2006.01)
(52) U.S. Cl. ...................................... 452/123
(58) Field of Classification Search ............ 452/21–26, 452/30–35, 46, 51, 123
See application file for complete search history.

(56) References Cited

U.S. PATENT DOCUMENTS

| | | | | |
|---|---|---|---|---|
| 3,885,053 | A * | 5/1975 | Townsend | 426/276 |
| 4,097,963 | A * | 7/1978 | Hammer et al. | 428/34.8 |
| 4,293,980 | A | 10/1981 | Ward | |
| 4,306,334 | A | 12/1981 | Niedecker | |
| 4,307,489 | A | 12/1981 | Niedecker | |
| 4,468,839 | A | 9/1984 | Chittenden | |
| 4,829,637 | A | 5/1989 | Norrie | |
| 5,207,608 | A * | 5/1993 | Oxley et al. | 452/27 |
| 5,207,609 | A * | 5/1993 | Oxley et al. | 452/27 |
| 5,470,519 | A * | 11/1995 | Markulin | 264/193 |
| 5,503,594 | A | 4/1996 | Karubian et al. | |
| 5,607,349 | A | 3/1997 | Karubian et al. | |
| 5,855,506 | A | 1/1999 | Burke | |
| 5,980,375 | A | 11/1999 | Anderson et al. | |
| 6,083,096 | A | 7/2000 | Carrillo | |
| 6,254,470 | B1 | 7/2001 | Burke | |
| 6,444,248 | B1 * | 9/2002 | Franklin et al. | 426/513 |
| 6,468,145 | B1 | 10/2002 | Houtz et al. | |
| 6,605,308 | B2 | 8/2003 | Shane et al. | |
| 6,685,550 | B2 | 2/2004 | Houtz et al. | |
| 6,692,344 | B2 | 2/2004 | Burke | |
| 6,733,812 | B2 * | 5/2004 | Franklin et al. | 426/513 |
| 6,740,349 | B2 * | 5/2004 | Franklin et al. | 426/513 |
| 7,134,954 | B2 * | 11/2006 | Yoshikawa et al. | 452/32 |

* cited by examiner

*Primary Examiner* — Thomas Price
(74) *Attorney, Agent, or Firm* — Brian G. Gilpin; Godfrey & Kahn, S.C.

(57) ABSTRACT

A method and apparatus for treating processed food casing in preparation for stuffing. The method includes extending the casing, applying (e.g., spraying) an organic acid (e.g., a citric acid solution) to the exterior surface of the casing to produce a treated casing, and mounting the treated casing onto a stuffer. In one embodiment, extending includes removing the casing from a brine solution and laying the casing onto a support surface (e.g., attaching to a movable conveyor). The casing in the brine solution is commonly attached to a ring, and preferably attaching includes hooking the ring onto an engagement member on the conveyor. If desired, the method can also include rinsing the casing (e.g., spraying a water solution onto an exterior surface of the casing) after extending the casing and before and/or after applying the organic acid.

1 Claim, 5 Drawing Sheets

METHOD AND APPARATUS FOR TREATING SAUSAGE CASING

BACKGROUND

The present invention relates to processed meat products, and more specifically to treating sausage casing in preparation for stuffing.

Processed meat products, such as sausage, are commonly stuffed into a casing, which forms the shape of the product. In the case of sausage, for example, the casing is tubular and is twisted closed at each end to form a generally cylindrical food product.

One type of casing is a natural casing that comes from the intestine of an animal, such as a pig. Natural casing is harvested during the rendering process and is thoroughly cleaned prior to shipment to the meat stuffing facility. During transport, the casing is commonly placed in a mesh bag and into a barrel filled with a brine solution to reduce the growth of bacteria on the casing. Prior to stuffing, the bag is removed from the brine solution and placed into a water bath to rinse to brine solution from the casing. The bag is then placed into an acid bath to further reduce bacteria count on the casings in the bag. The bag is then rinsed with a water solution to reduce the amount of acid on the casings. Finally, the bags are opened, and the casing are placed onto a stuffer for the stuffing operation.

SUMMARY

The present invention provides a method of treating processed food casing in preparation for stuffing. The method includes extending the casing, applying (e.g., spraying) an organic acid (e.g., a citric acid solution) to the exterior surface of the casing to produce a treated casing, and mounting the treated casing onto a stuffer. In one embodiment, extending includes removing the casing from a brine solution and laying the casing onto a support surface (e.g., attaching to a movable conveyor). The casing in the brine solution is commonly attached to a ring, and preferably attaching includes hooking the ring onto an engagement member on the conveyor.

If desired, the method can also include rinsing the casing (e.g., spraying a water solution onto an exterior surface of the casing) after extending the casing and before and/or after applying the organic acid.

The above-referenced process can be performed utilizing an apparatus for treating a processed food casing prior to stuffing. The apparatus comprises a movable conveyor (e.g., having a support surface) including an engagement member that follows a conveyor path, and an organic acid rinse station (e.g., comprising a citric acid solution and a sprayer) positioned along the conveyor path (e.g., above the support surface). In one embodiment, the apparatus further comprises a water rinse station positioned above the support surface upstream and/or downstream of the organic rinse station. To facilitate loading of the casings onto the conveyor, the apparatus can further include a drain table positioned adjacent the inlet, and a barrel dumper positioned to dump a barrel's contents onto the drain table.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
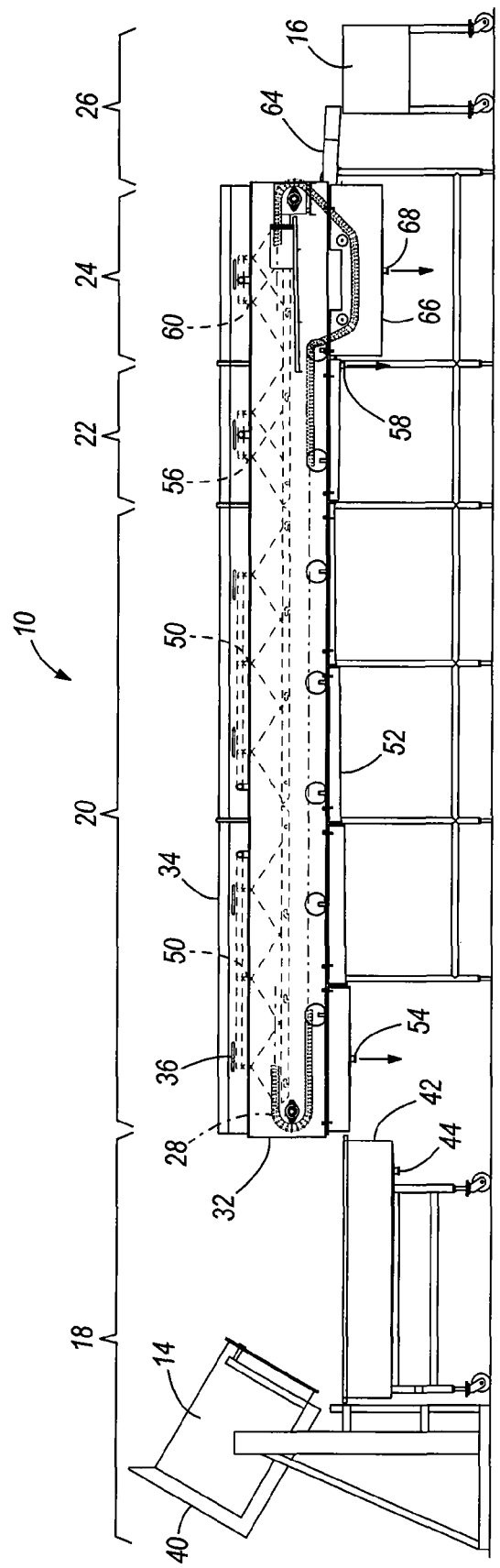
FIG. 1 is a side view of an apparatus for treating processed meat casing and embodying aspects of the present invention.
Figure 2:
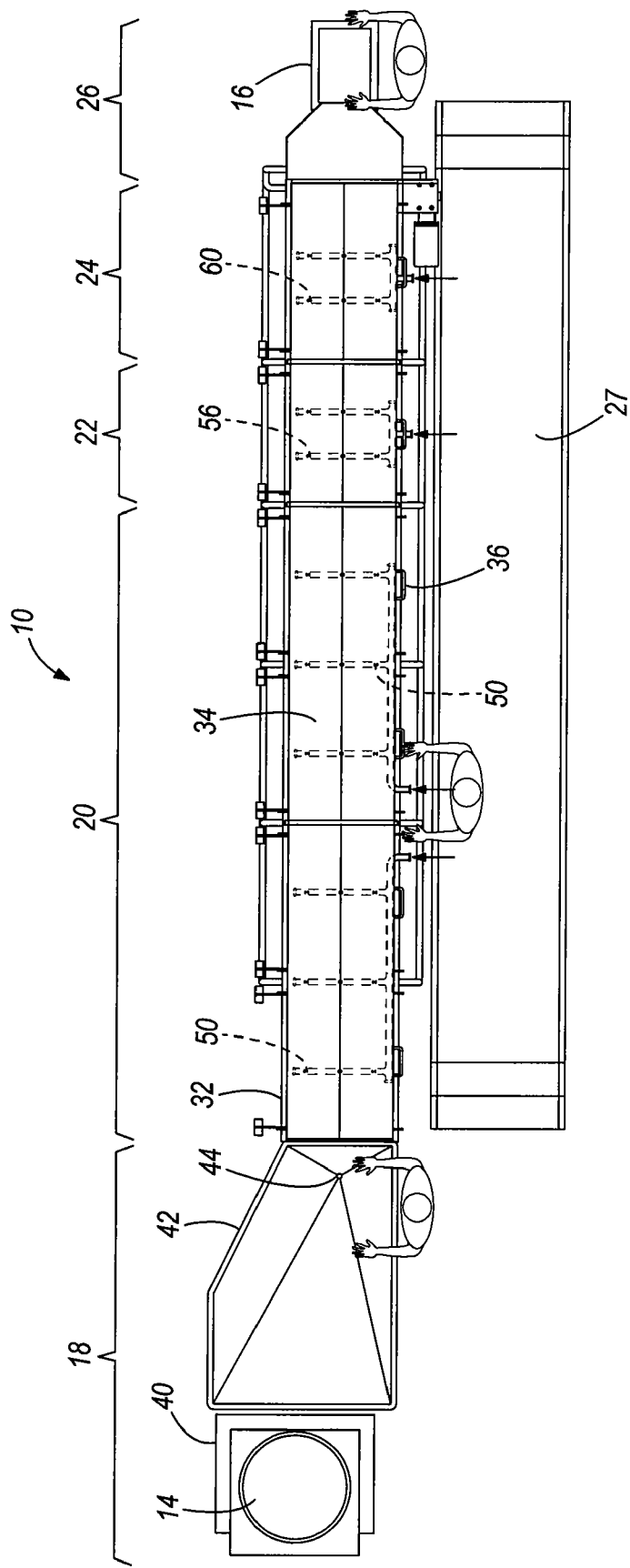
FIG. 2 is a top view of the apparatus shown in FIG. 1.
Figure 3:
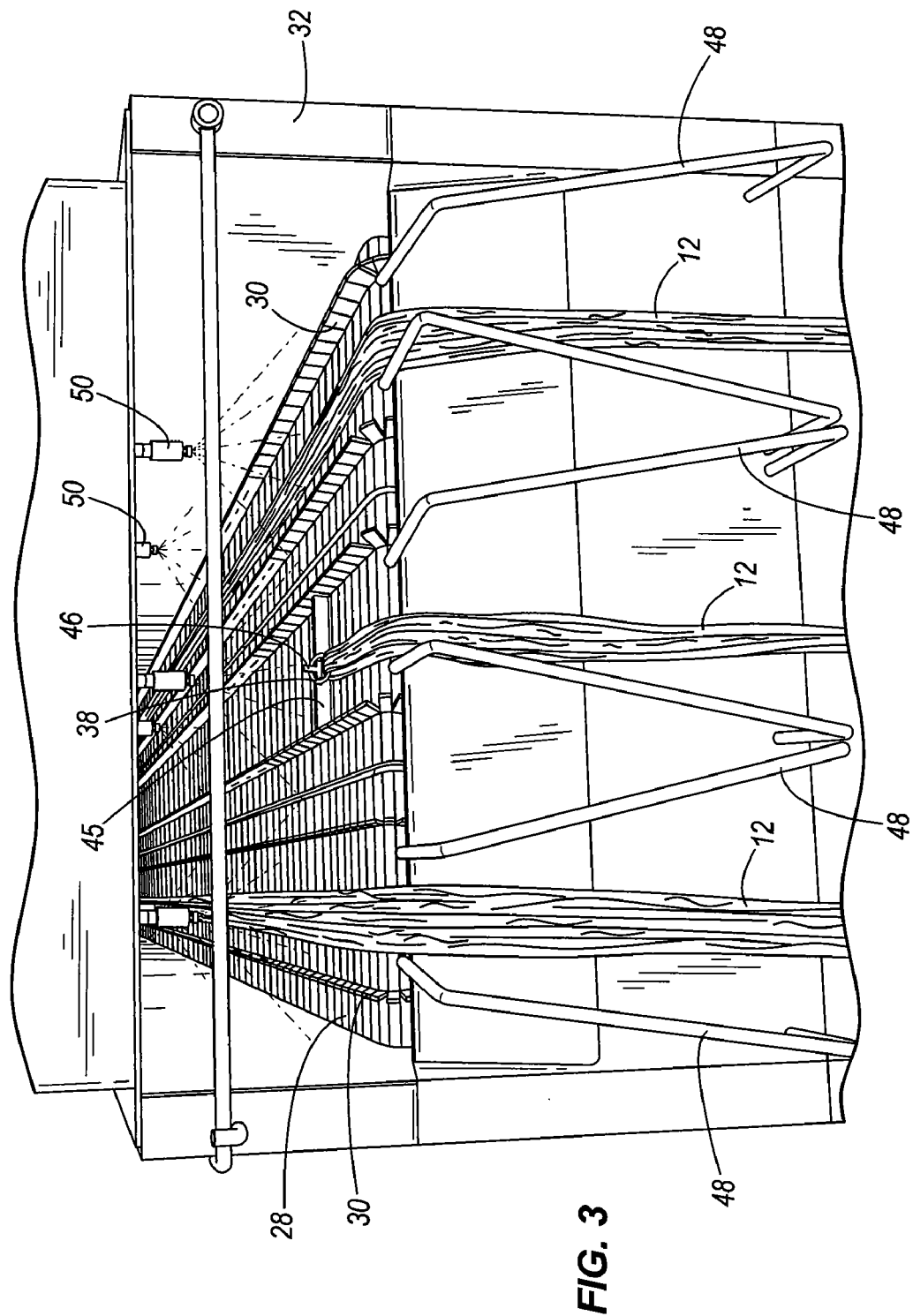
FIG. 3 is an enlarged perspective view of the product loading section.
Figure 4:
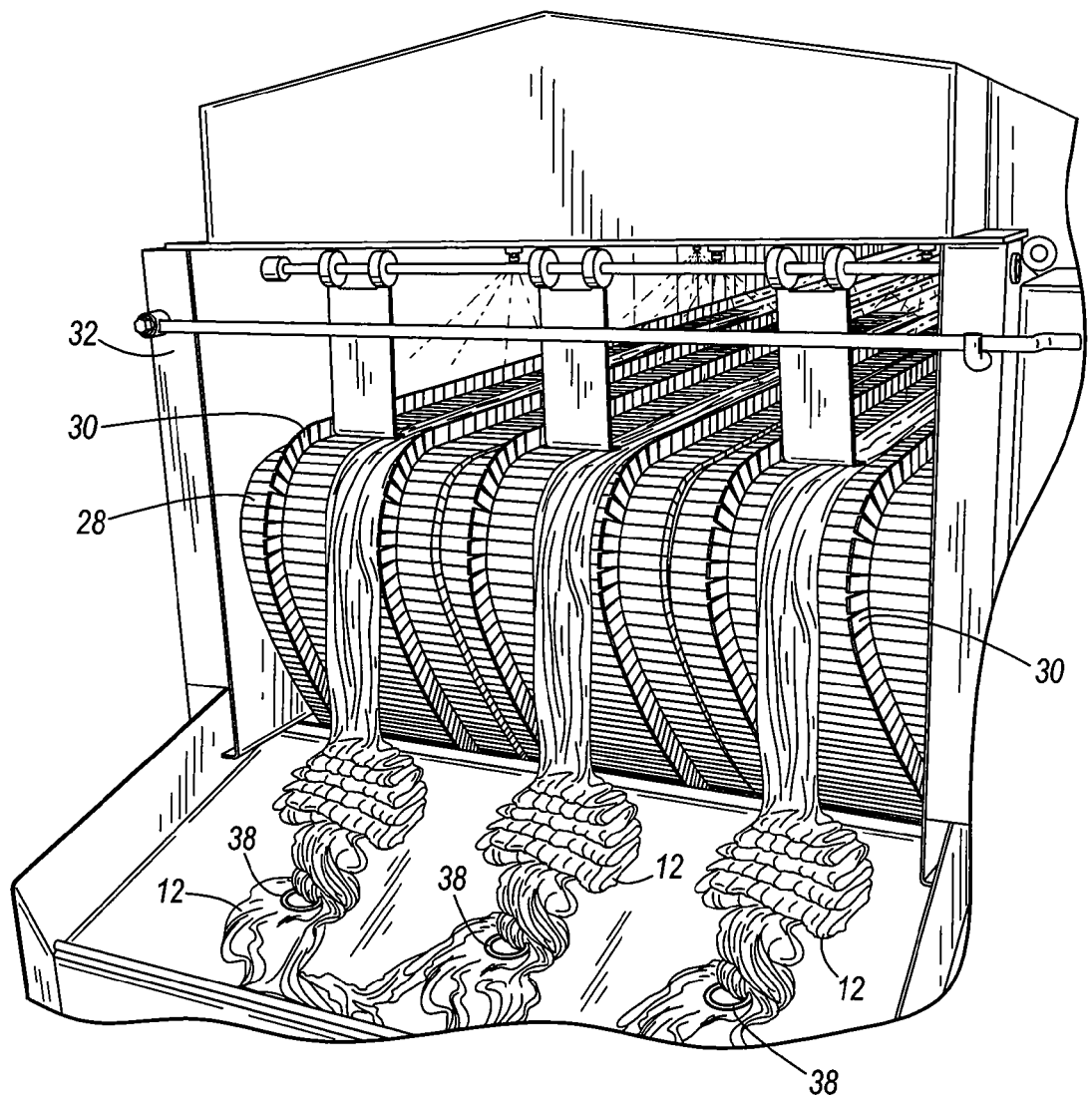
FIG. 4 is an enlarged perspective view of the product unloading section 26.

Referring to FIGS. 1-3, the illustrated apparatus 10 is designed to receive sausage casings 12 from a barrel 14, treat the casings 12, and discharge them to a portable cart 16. The apparatus 10 includes a loading section 18, a pre-rinse section 20, an acid treatment section 22, a post-rinse section 24, and an unloading section 26. An elevated walkway 27 allows workers to monitor the operation of the apparatus 10.

A conveyor 28 continuously travels from the loading section 18 to the unloading section 26, and includes a series of fing 30 that separate the conveyor 28 into three distinct treatment paths, as will be described below in more detail. The conveyor 28 travels through a housing 32 that shields the pre-rinse section 20, acid treatment section 22, and post-rinse section 24. Each section of the housing 32 includes a hinged hood 34 that can be pivoted upward to allow visual and physical access to the conveyor 28 and other parts inside the housing 32. Lifting of the hoods 34 is facilitated by handles 36.

The casings 12 are supplied in a brine solution in the barrel 14. In the barrel 14, the casings 12 are each attached to a ring 38. A single casing or multiple casings 12 can be attached to a single ring 38. The use of a ring 38 facilitates easier handling of the casings 12 during the treating process.

The illustrated loading section 18 includes a barrel dumper 40 and a portable drain table 42. The barrel 14 filled with casings 12 and brine solution is mounted on the barrel dumper 40, which facilitates dumping of the casings 12 onto the drain table 42. The drain table 42 holds the casings 12 and allows the brine solution to drain off the table through a table drain 44. The dumper can be manual or powered.

In the loading section 18, a worker pulls casings 12 from the drain table 42 and attaches them to the conveyor 28. More specifically, the worker engages a ring 38 (attached to one or more casings 12) and engages the ring 38 with an engagement member 46 on the conveyor 28. Each of the three defined treatment paths of the conveyor 28 includes a single engagement member 46 mounted on a support member 45 that will pass the loading section 18 once per revolution of the conveyor 28. The engagement members 46 of the three treatment paths are staggered from each other so that they pass the loading section 18 at different times in order to facilitate easier loading of the casings 12.

After engaging the ring 38 onto the engagement member 46, the engagement member 46 moves up and away from the drain table 42 to pull the ring 38 (and the attached casings 12) away from the drain table 42. The presence of V-shaped separator bars 48 helps separate and untangle the casings 12. As the conveyor 28 continues to pull the ring 38, the worker and the separator bars 48 insure that the casings 12 are extended and do not tangle or get bunched up on the conveyor 28. In the illustrated embodiment, the conveyor 28 is capable of simultaneously handling three separate rings 38 of casings 12 in the three treatment paths.

The pre-rinse section 20 includes a series of pre-rinse sprayers 50 that spray a water-based solution toward the conveyor 28 and onto the casings 12 traveling on the conveyor 28. The pre-rinse sprayers 50 are designed to remove at least some of the external substances (e.g., brine solution) from the outside surface of the casings 12. In the illustrated embodiment, there are six pre-rinse sprayers 50 for each of the three treatment paths, for a total of eighteen pre-rinse sprayers 50.

The bottom 52 of the housing 32 in the pre-rinse section 20 is divided into four distinct sections. The bottom 52 closest to the loading section 18 is the lowest, and the other bottoms 52 are incrementally slightly higher, with the highest being the bottom 52 furthest from the loading section 18. With this arrangement, the pre-rinse solution that falls to the bottom 52 of the housing 32 in the pre-rinse section 20 will drain toward the loading section 18, and will exit the housing 32 through a pre-rinse drain 54.

The acid treatment section 22 is downstream of the pre-rinse section 20 and includes a series of acid sprayers 56 that spray a citric acid solution toward the conveyor 28 and on the casings 12 traveling on the conveyor 28. The citric acid solution comprises a Ph in the range of about 2.8 to about 4.0, with an average pH of about 3.2. The acid sprayers 56 are designed to coat the exterior surface of the casings 12 with the citric acid solution to reduce the presence of bacteria on the exterior surface of the casings 12. In the illustrated embodiment, there are two acid sprayers 56 for each of the three treatment paths, for a total of six acid sprayers 56. After being sprayed onto the casings 12, the citric acid solution falls to the bottom 52 of the housing 32 in the acid treatment section 22 and exits the housing 32 through an acid treatment drain 58.

The post-rinse section 24 includes a series of post-rinse sprayers 60 that spray a water-based solution toward the conveyor 28 and onto the casings 12 traveling on the conveyor 28. The post rinse sprayers 60 are designed to remove at least some of the external substances (e.g., citric acid or brine solution) from the outside surface of the casings 12. In the illustrated embodiment, there are two post rinse sprayers 60 for each of the three treatment paths, for a total of six post rinse sprayers 60. After being sprayed onto the casings 12, the water-based solution falls onto an inclined platform 62 and drains into the bottom 52 of the acid treatment section 22, where it exits the housing 32 through the acid treatment drain 58.

The unloading section 26 includes an angled ramp 64 that receives the casings 12 from the conveyor 28 and provides them to the portable cart 16. Specifically, as the rings 38 of the casings 12 reach the end of the conveyor 28, the rings 38 and casings 12 fall off the conveyor 28 and onto the angled ramp 64. The casings 12 can then be slid (or will slide on their own) down the ramp and into the portable cart 16, which can be filled with a water-based solution. The cart 16 includes wheel so that the cart 16 can be easily transported to a stuffer, where the casings 12 can be used to produce sausage.

Figure 5:
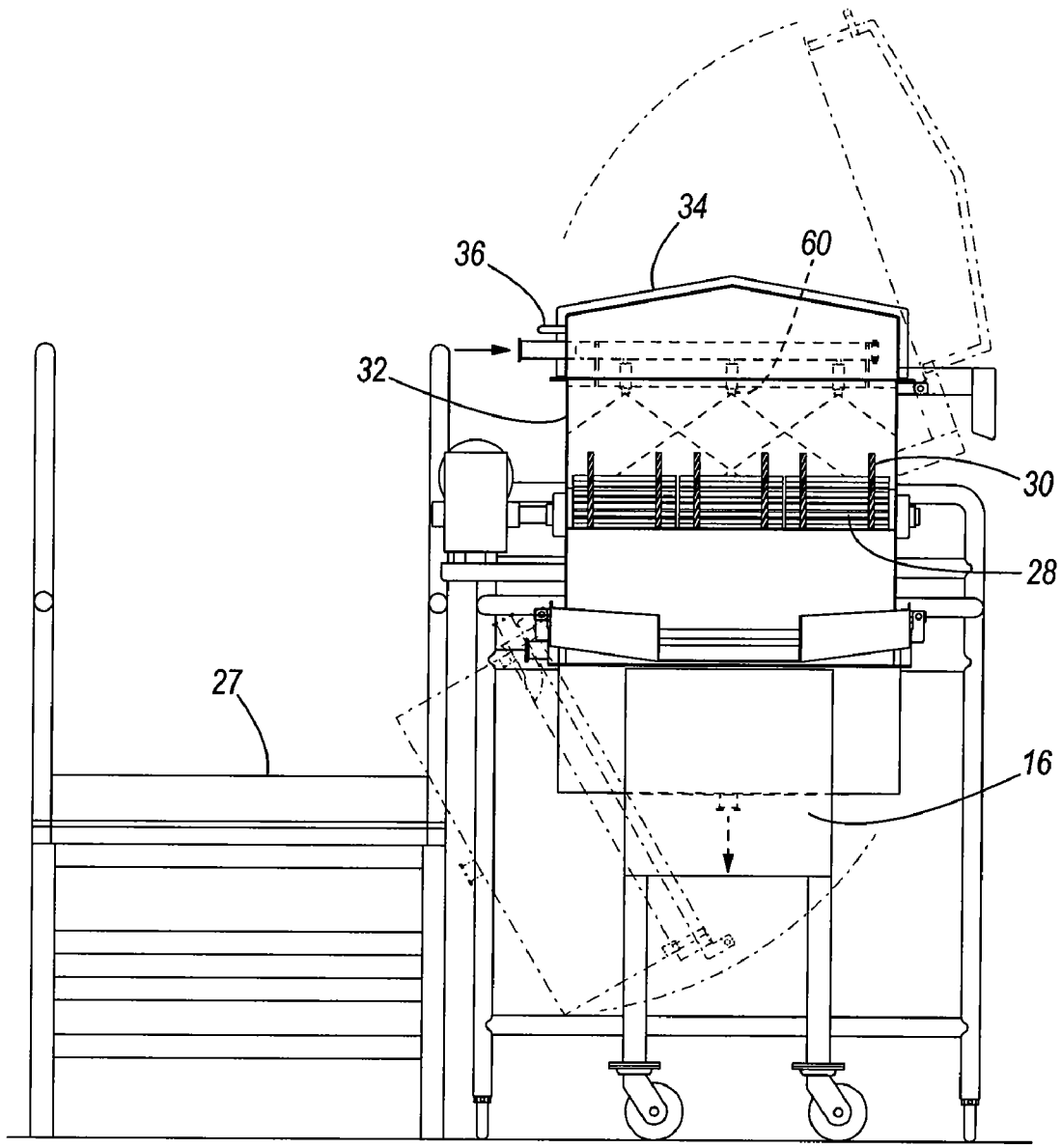
FIG. 5 is an end view of the apparatus in FIG. 1, taken from the unloading end.

Referring to FIGS. 1 and 5, the apparatus 10 further includes a conveyor bath 66 for rinsing the conveyor 28 after it discharges the casings 12 onto the angled ramp 64. The bath 66 is filled with a cleaning solution (e.g., a caustic solution) through which the conveyor 28 will pass on its return path to the loading section 18. A bath drain 68 allows the contents of the bath 66 to be drained. The conveyor bath 66 is hinged to the bottom 52 of the housing 32, and can be pivoted down in order to provide access to the conveyor 28 and other parts in the post-rinse section 24 of the apparatus 10.

Various features and advantages are set forth in the following claims.

What is claimed is:

1. An apparatus for treating a processed food casing prior to stuffing, comprising:
    a movable conveyor including an engagement member that follows a conveyor path;
    an organic acid rinse station positioned along the conveyor path;
    wherein the conveyor comprises an inlet, and wherein the apparatus further comprises:
    a drain table positioned adjacent the inlet; and
    a barrel dumper positioned to dump a barrel's contents onto the drain table.

* * * * *